M. ARNOLD.
COUPLING FOR AIR CONDUITS.
APPLICATION FILED AUG. 1, 1914.
1,168,456.
Patented Jan. 18, 1916.
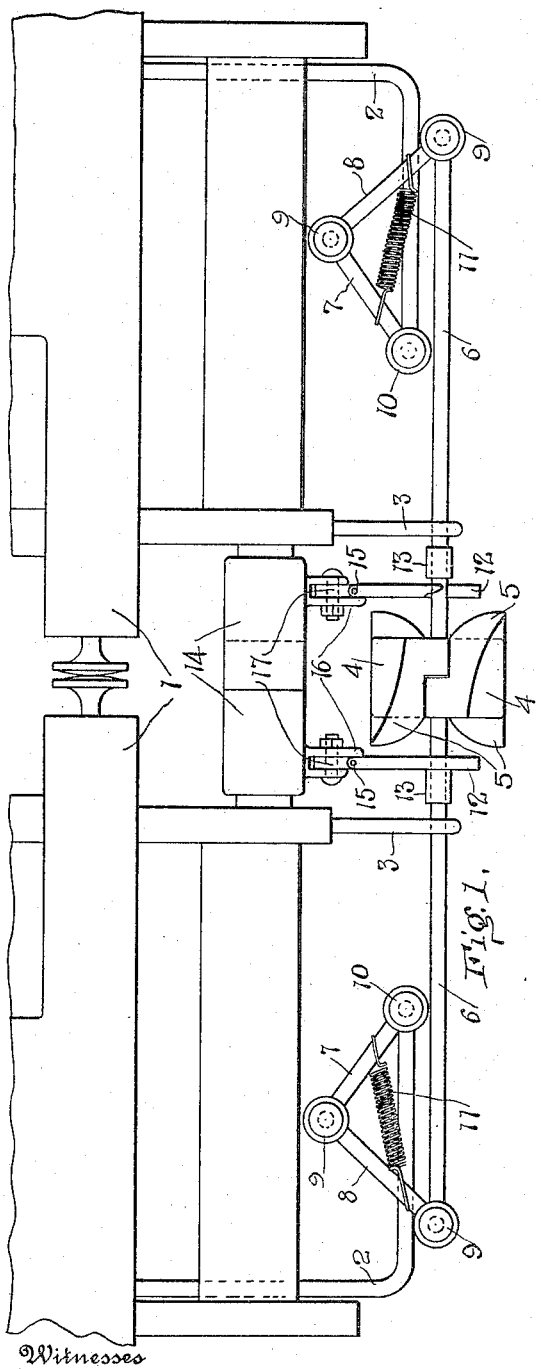
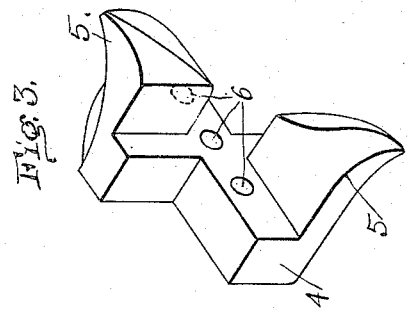
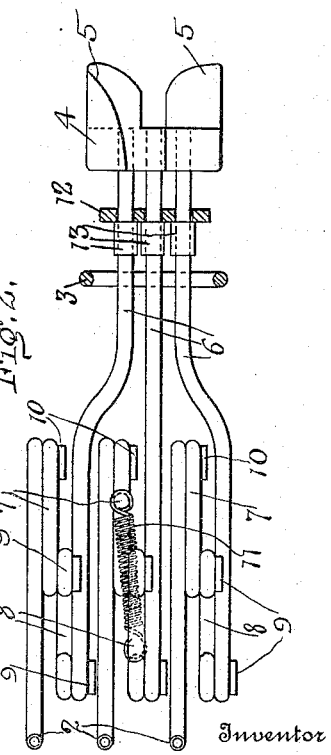
Inventor
Melville Arnold.

UNITED STATES PATENT OFFICE.

MELVILLE ARNOLD, OF LIMA, OHIO.

COUPLING FOR AIR-CONDUITS.

1,168,456.	Specification of Letters Patent.	Patented Jan. 18, 1916.

Application filed August 1, 1914. Serial No. 854,454.

*To all whom it may concern:*

Be it known that I, MELVILLE ARNOLD, a citizen of the United States, residing at Lima, in the county of Allen and State of Ohio, have invented certain new and useful Improvements in Couplings for Air-Conduits, of which the following is a specification, reference being had therein to the accompanying drawing.

This invention relates to couplings for air conduits, and the like, on railway cars.

The object of the invention is to provide means to automatically connect the air pipes, steam pipes and the like when the cars are coupled, thus making it unnecessary for the brakemen or attendants to enter the space between the cars.

To this end it is a further object of the invention to provide means for supporting the conduits on the two cars in substantial alinement and to guide the ends of the conduits into registration when the two cars are moved together; and further, to provide means for yieldingly supporting the conduits to hold the ends of the conduits in snug engagement, although the distance between the two cars may vary.

It is also an object of the invention to provide a single coupling for coupling a plurality of train pipes, such as the air brake pipe, steam pipe and the compressed air signal pipe, which are commonly found upon modern railway coaches.

In the accompanying drawings, Figure 1 is a side elevation of portions of two cars showing my invention applied thereto; Fig. 2 is a plan view of the movable portions of a plurality of conduits showing the same provided with a coupling head; and Fig. 3 is a detail view of the coupling head.

In these drawings I have illustrated one embodiment of my invention and have shown the same as applied to the frames of ordinary railway cars, as shown at 1, which constitute the supporting members for the conduits or train pipes which are indicated as a whole by the reference numeral 2. The adjacent ends of the respective conduits are supported in substantial alinement by means of yokes or supporting bars 3 depending from the frames of the respective cars and having portions extending beneath the end portions of the conduits. Each conduit is provided at its outer end with a head 4 forming part of a coupling. These heads are mounted on the conduits and the latter extend through the heads. The two heads are provided with parts, such as the flared projections or arms 5, which coöperate to guide the ends of the conduits into registering alinement so that when the cars have been coupled the ends of the respective conduits will be in exact registration. If desired, packings or yielding seats of any kind may be provided at the ends of the conduits to form a tight connection but with the present construction of the device this is deemed unnecessary, and as these seats may be of any well known construction they have not been here illustrated. The projections 5 and the adjacent portions of the heads are arranged in such interlocking arrangement as to prevent any lateral or rotary displacement of the heads and serve to maintain the conduits in coupled relation until lengthwise movement is imparted to one or both of the heads.

Coupled cars have considerable range of movement toward and away from each other while they are coupled and in order that the train pipes may remain properly coupled during these movements it is desirable that those portions of the train pipes which are directly connected to the coupling heads should be capable of yielding, and, to this end, the train pipes are formed of metal throughout, instead of being partially of flexible material, and the end portions, to which the coupling heads are directly connected, are formed separate from the body of the pipe, as shown at 6, and are so mounted as to be capable of longitudinal movement. While the connection of the parts 6 with the main portions of the train pipes 2 may be of any suitable character I have, for mechanical reasons, formed a pivotal connection between these parts. As here shown the body of the pipe has an upwardly and rearwardly extending portion 7 which is in the form of a link and is connected by means of an intermediate portion or link 8 with the end portion 6 of the pipe. The ends of the link 8 are connected with the respective parts of the pipe by means of pivotal couplings 9 of any suitable character and inasmuch as these couplings do not form a part of the present invention they are not illustrated in detail. This arrangement enables the end portion 6 of the train pipe to have longitudinal movement in a substantially straight line. If desired, however, the upturned portion 7 of the pipe may be pivotally connected with the body portion thereof, as shown at 10, and, when so connected, the end portion can be caused to move in a straight line. Springs 11 act upon the end portions 6 of the train pipes to impart lengthwise movement thereto and these springs tend to press the two coupling heads firmly together and have sufficient elasticity to maintain the heads in this relation even though the distance between the cars may vary to the greatest limit permitted by the couplings. To prevent the springs from moving the heads too far forward when the train pipe has been uncoupled slotted guides 12 are provided which are engaged by shoulders or collars 13 arranged on the end portions of the pipes near the coupling heads. These guides are preferably connected to the automatic car couplers, which are shown at 14, and to prevent injury to the coupling head should one of the draw bars of the coupling 14 pull out of the car, the guides are pivoted at 15 in a direction to permit them to ride over the coupling head as the draw bar moves past the same. Stops 16 prevent the forward movement of the guides about these axes and enable them to form stops to coöperate with the shoulders 13 as above described. It is also desirable that the coupling heads should be capable of lateral movement relatively to the car and, to this end, the guides 12 are pivotally connected to their supporting members on longitudinal axes, as shown at 17, and the supporting members 3 are of such a character as to allow the lateral movement of the train pipes. The length of the end portions 6 of the train pipes and their manner of connection with the body portions of the pipes are such as to permit of the lateral displacement of the coupling relatively to the main pipe. Consequently, when the train rounds a curve a lateral swinging movement will be imparted to the coupling heads and there will be very little tendency for the same to pivot about one edge and thus break the connection between the ends of the conduits.

While I have shown and described one embodiment of the invention it will be understood that the same has been chosen for the purposes of illustration only, and that I do not desire to be limited to the details of construction shown and described, for obvious modifications will occur to a person skilled in the art.

Having thus fully described my invention, what I claim as new and desire to secure by Letters Patent, is:—

1. In a coupling for a train pipe, a train pipe comprising a fixed portion and a longitudinally movable portion overlapping said fixed portion and provided with a coupling head, link-like portions pivotally connected to the respective ends of said overlapping portions, extending rearwardly at acute angles thereto and pivotally connected one to the other, and a spring to move said movable portion of said train pipe in one direction.

2. In a coupling for a train pipe, a train pipe comprising a fixed portion and a longitudinally movable portion having a coupling head at one end and having its other end overlapping and arranged substantially parallel to said fixed portion, two intermediate portions pivotally connected one to the other and pivotally connected at their opposite ends to the respective ends of said fixed portion and said movable portion, that intermediate portion which is connected with said fixed portion extending rearwardly at an acute angle to said fixed portion, and a spring connected with said intermediate portions and tending to move them toward each other to impart longitudinal movement to said movable portion of said train pipe.

3. In a coupling for a train pipe, a train pipe comprising a fixed portion, a longitudinally movable portion having a coupling head, and intermediate portions pivotally connected one with the other and with said fixed portion and said movable portion on horizontal axes, a spring acting on said movable portion, and a supporting bar engaging the movable portion of said train pipe between said coupling head and its point of connection with said intermediate member and arranged to support said pipe against downward movement and to permit the same to have free lateral movement.

4. In a coupling for a train pipe, a train pipe comprising a fixed portion, a longitudinally movable portion having a coupling head, and intermediate portions pivotally connected one with the other and with said fixed portion and said movable portion, respectively, on horizontal axes, a spring acting on said movable portion, and a supporting bar engaging the movable portion of said train pipe between said coupling head and its point of connection with said intermediate member and arranged to support said pipe against downward movement and to permit the same to have free lateral movement, and a stop to limit the movement of said movable portion of said train pipe under the influence of said spring.

5. The combination, with a car having a coupler, a train pipe mounted on said car comprising a fixed portion, and a longitudinally movable portion having a coupling head, a spring to impart movement to said longitudinally movable portion, a stop carried by said longitudinally movable portion, a coöperating stop pivotally mounted on said car coupler, and means to prevent the movement of said coöperating stop in one direction, whereby it will limit the movement of said longitudinal member but will ride over the coupling head on said longitudinally movable member if said car coupler moves relatively thereto.

6. The combination with a car coupler, of a train pipe comprising a fixed portion and a longitudinally movable portion having a coupling head, a spring to impart movement to said longitudinally movable portion, a supporting member to retain said longitudinally movable portion in a horizontal position and permit it to have lateral movement, a stop carried by said longitudinally movable portion, and a coöperating stop mounted on said car coupler for movement about two axes extending respectively longitudinally and transversely of said movable portion of said train pipe, and means to hold said coöperating stop against movement in one direction about said transverse axis.

7. The combination, with two cars having coöperating coupling heads, of train pipes carried by the respective cars and each comprising an end portion capable of longitudinal movement relative to the body of the train pipe, a stop carried by said end portion, a guide mounted on the coupling head of the car carrying said train pipe and slotted to receive the end portion of said train pipe, said guide being connected with said coupling head for pivotal movement in one direction to permit said coupling head to move relatively to said train pipe and being held against movement in the opposite direction to cause it to coöperate with the stop on the end portion of said train pipe to limit the movement thereof in one direction, and a coupling for the two train pipes comprising coupling heads carried by the respective end portions of the train pipes and having parts coöperating to guide the ends of said pipes into registering alinement.

In testimony whereof, I affix my signature in presence of two witnesses.

MELVILLE ARNOLD.

Witnesses:
 Frank A. Eaton,
 Theodore S. Parent.

Copies of this patent may be obtained for five cents each, by addressing the "Commissioner of Patents, Washington, D. C."